United States Patent [19]

Elmquist et al.

[11] Patent Number: 4,696,353

[45] Date of Patent: Sep. 29, 1987

[54] DRILLING MUD CLEANING SYSTEM

[75] Inventors: Steven A. Elmquist, North Ridgeville; Leonard E. Boesger, Aurora, both of Ohio

[73] Assignee: W. S. Tyler, Incorporated, Mentor, Ohio

[21] Appl. No.: 863,760

[22] Filed: May 16, 1986

[51] Int. Cl.⁴ ............................................. E21B 7/18
[52] U.S. Cl. ..................................... 175/206; 175/66; 209/44; 210/388
[58] Field of Search .................. 175/66, 206; 209/44, 209/211, 459, 697; 210/388, 280

[56] References Cited

U.S. PATENT DOCUMENTS

| | | | |
|---|---|---|---|
| 2,169,675 | 8/1939 | Bays | 210/388 |
| 2,276,075 | 3/1942 | Wuensch | 175/66 |
| 2,700,469 | 1/1955 | Humphreys | 209/459 |
| 2,724,498 | 11/1955 | Beresford | 209/697 |
| 2,870,990 | 1/1959 | Bergey | 175/66 |
| 2,886,287 | 5/1959 | Croley | 209/211 |
| 2,919,898 | 1/1960 | Marwil et al. | 209/211 |
| 2,923,151 | 2/1960 | Engle et al. | 209/211 |
| 2,941,783 | 6/1960 | Stinson | 209/211 |
| 3,713,499 | 1/1973 | Arscott et al. | 175/66 |
| 3,964,557 | 6/1976 | Juvkam-Wold | 175/206 |
| 4,306,974 | 12/1981 | Harry | 210/388 |
| 4,387,019 | 6/1983 | Dale et al. | 209/44 |

Primary Examiner—Stephen J. Novosad
Assistant Examiner—William P. Neuder
Attorney, Agent, or Firm—Robert L. Olson; William W. Habelt

[57] ABSTRACT

A mud cleaning system for recovering barite from drilling mud coming from an oil well, the mud being made up essentially of barite particles having a specific gravity of 4.2 or more, and a particle size mostly finer than 200 mesh, drill cuttings having a specific gravity of 2-3, and varying particle sizes ranging from about 200 mesh to ½ inch or more, and water. This system includes a first sieve bend (32), a second screen member (10) in series therewith, and a spiral separator (54), in series with the screens. The sieve bend is provided with a vibrator (18, 20), and water sprays (16, 34) act in conjunction with the sieve bend and the second screen to aid in the separation. The slurry leaving the spiral separator is screened to remove the ultra fine particles and the water is recycled. The system inherently washes potentially environmentally hazardous substances off the drill cuttings prior to their discharge from the system. The flow of slurry from the sieve bend to the screen or spiral separator will be a function of the depth of well and barite usage.

2 Claims, 2 Drawing Figures

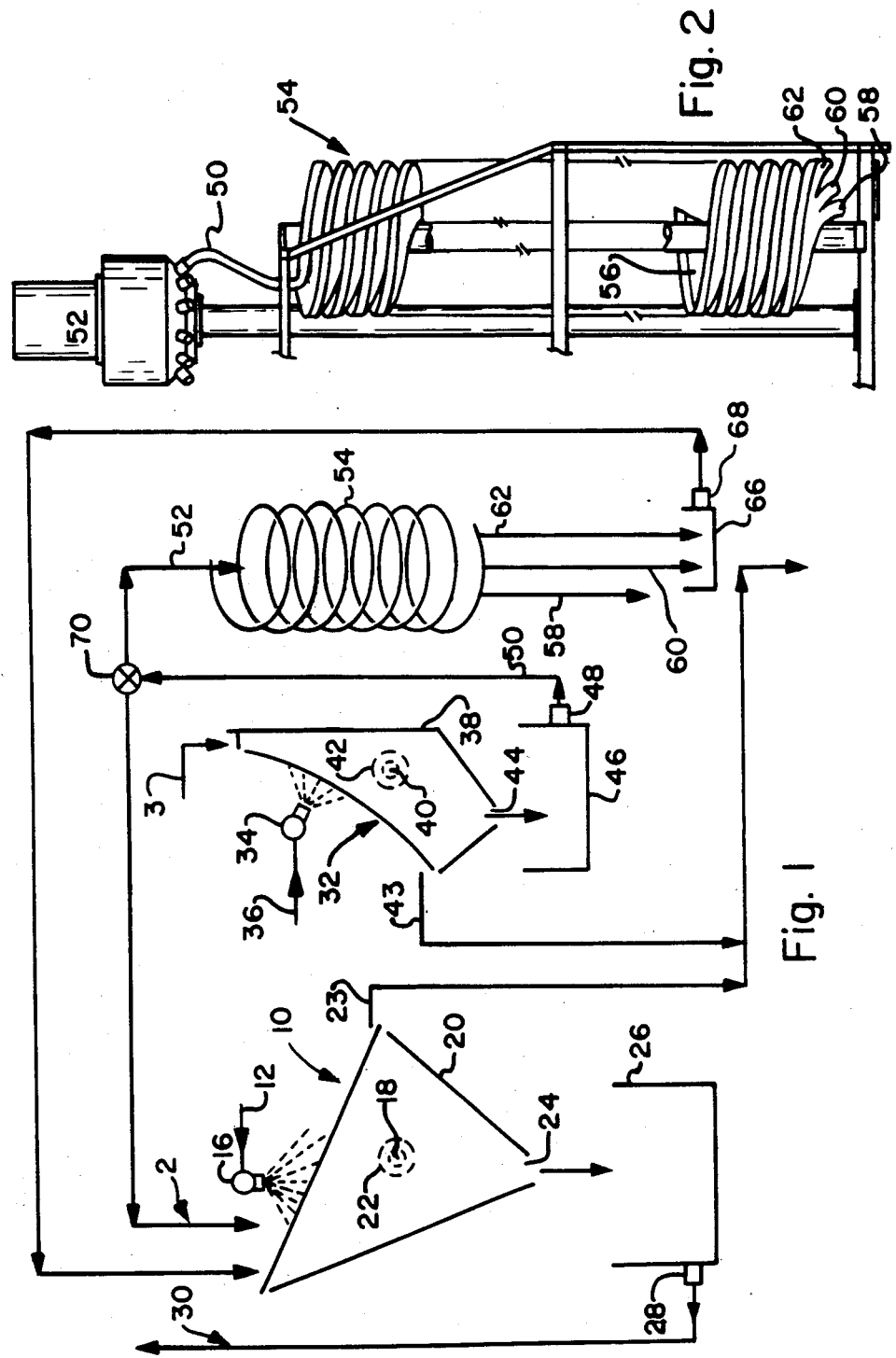

DRILLING MUD CLEANING SYSTEM

BACKGROUND OF THE INVENTION

In oil well drilling, drilling mud must be supplied to the hole as the well depth progresses. One of the basic functions of drilling mud is to carry the drill cuttings up to the surface so they can be disposed of. A drilling mud in common use today is typically composed of barite and water. There may be other constituents, (such as oil) but they would exist only in small amounts or percentages. Since large quantities of drilling mud are needed in drilling an oil well, it is desirable to recover the barite, and recycle it. Various drilling mud cleaning systems are in use today for separating the drill cuttings from the slurry so that the fluid and/or barite can be recycled. Most systems use a combination of one or more screens or sieves in a series flow relationship, with a final separating step using a hydrocyclone or centrifuge. Hydrocyclones and centrifuges are expensive pieces of equipment with high energy and maintenance costs.

SUMMARY OF THE INVENTION

In accordance with the invention, a drilling mud cleaning system is provided which efficiently separates the fluid, barite and/or refuse. The system is low in capital, energy and maintenance costs. The system consists of screens and/or sieve bends and a spiral separator. The screens may or may not include vibrating mechanisms, but preferably have them. Spray bars may also be associated with each screen.

BRIEF DESCRIPTION OF THE DRAWINGS

FIG. 1 is a schematic of a drilling mud cleaning system constructed in accordance with the invention; and FIG. 2 is a partial side view of the spiral separator shown in FIG. 1.

DESCRIPTION OF THE PREFERRED EMBODIMENT

Looking now to FIG. 1, a drilling mud cleaning system is schematically shown. The drilling mud, pumped up from the oil well and containing the drill cuttings, is discharged onto a sieve bend 32 through line 3. The feed to the system consists of cuttings, water and at times will include a barite material. The barite material is denser than the cuttings, having a specific gravity of 4.2 or more. The barite particles are generally quite small, with the majority of them (over 90%) being 200 mesh or finer. The drill cuttings are of lesser density, having a specific gravity of 2.0–3.0. These particles can vary widely in size, ranging anywhere from an inch in diameter to finer than 200 mesh.

The top of sieve bend 32 is of a fairly large opening size within the range of 1/16" to ¼". Thus, only the rather large drill cutting particles are separated out at this point. The bottom of the sieve bend will make a separation at about 35–65 mesh. Water is supplied to a spray bar 34 through line 36 to aid in the separation. The water spray tends to thin the mud, and also wash loose barite particles clinging to the large drill cutting particles, so that essentially all of the small barite particles pass through the sieve bend. The water sprays also aid in preventing blinding of the sieve bend openings thereby increasing the efficiency and capacity of the sieve bend. To aid in the performance, a vibrator and/or rapping device (not shown) can be attached to the sieve bend.

The oversized drill cutting particles not passing through the sieve bend are discharged through line 43. The slurry, along with the barite and/or small drill cutting particles, are gravity discharged through bottom opening 44 into a sump 46. The pump 48 continuously pumps this slurry through line 50. If the slurry contains no barite, a valving system 70 will then divert the slurry to feed point 2 which feeds to a second screening member, shown as an inclined vibrating screen 10. The chamber 20 and the attached screen is vibrated by the eccentric weight 22 attached to the rotating shaft 18. The openings in the screen 10 are much smaller than that of sieve bend 32. For example, this screen is on the order of 60 to 200 mesh. Thus, the slurry discharged through opening 24 into sump 26 now contains only the very fine size drill cutting particles. The slurry is then recycled to the well. The oversized drill cuttings are discharged at 23.

If barite is present, the valving system 70 will send the slurry to the upper inlet 52 of spiral separator 54. The slurry flows down the spiral chutes 56 (FIG. 2) of the separator, with the separation process proceeding in the well known manner of a typical spiral separator. A combination of gravity, centrifugal force, and frictional forces acting on the particles and slurry causes the following separation. Particles of large size and the highest specific gravity hug the axis, whereas particles of progressively smaller size or lesser specific gravity swing out farther and farther away from the axis. Slime and water follow the outside peripheral lip of the spiral. Thus, the barite material particles with a specific gravity of 4.2 or more, and being largely of 200 mesh or less, hug the axis and flow out through outlet line 58. These particles are recycled to make drilling mud by adding the appropriate amount of recycle water and other small amounts of constituents or additives as required. The majority of the drill cuttings, being of a specific gravity of 2–3, and particle size ranging from 25–300 mesh, are thrown farther away from the axis, and are removed through outlet 60. The water, along with some drill cutting particles, are discharged through outlet 62. The slurry in lines 60 and 62 are combined in a sump 66 and pumped by pump 68 (FIG. 1) to screen 10 for dewatering. The water will be recombined with the barite material in line 58 for recycle to the well.

With the above cleaning system, little barite material is lost, and a reduced amount of drill cuttings are returned to the well with the cleaned barite material. The initial capital cost of the system is low. Since there are no moving parts in the spiral separator, no energy other than pumping is required, and maintenance is minimal. By using vibrators and water sprays with the screens, they have a high capacity, as does the spiral separator. The spiral separator is capable of handling slurries having anywhere from 65% to more than 95% water (by volume). Thus, it works well in a cleaning system where water sprays are used in conjunction with the screens.

We claim:

1. A mud cleaning system for removal of drill cuttings and recovery of drilling mud coming from an oil well, where the mud slurry may be made up essentially of barite particles having a specific gravity of 4.2 or more and a particle size mostly under 200 mesh, drill cuttings having a specific gravity of 2–3, and varying particle sizes ranging from 200 mesh to ½ inch or more, and water; said system comprising:

a. a first screen means having a top end and a bottom end and a screen member extending therebetween having a plurality of openings therein, said first screen means adapted to receive at its top end the mud slurry from the well and to discharge an overflow slurry comprising oversize drill cuttings at the bottom while passing an underflow mud slurry containing substantially all of the barite particles that may be present in the mud through the plurality of openings in the screen member, the screen member of said first screen means comprising a sieve bend having openings near the top end thereof sized to pass material having a topsize ranging from $\frac{1}{8}$ inch to $\frac{1}{4}$ inch and openings near the bottom end thereof sized to pass material having a topsize ranging from 35 to 65 mesh;

b. first sump means for collecting the underflow mud slurry passing through the plurality of openings in the screen member of said first screen means;

c. a spiral separator having an upper end having an inlet for receiving the underflow mud slurry, a lower end having an outlet for discharging substantially all of the barite particles separately from a majority of the drill cuttings and the water in the received underflow mud slurry, and a spiral chute interconnecting the upper and lower ends of the spiral separator along which the received underflow mud slurry flows thereby effectuating the separation of substantially all of the barite particles from the slurry;

d. second sump means for collecting the drill cuttings and the water passing from the spiral separator;

e. second screen means for receiving and dewatering a slurry;

f. valve means having an inlet, a first outlet and a second outlet for receiving the underflow mud slurry from the first sump means through a first transport line interconnecting the first sump means to the inlet of the valve means and for selectively directing the received underflow mud slurry to the second screen means through a second transport line interconnecting the first outlet of the valve means to the second screen means when there are no barite particles present in the underflow mud slurry or to the spiral separator through a third transport line interconnecting the second outlet of the valve means to the inlet of the spiral separator when barite particles are present in the underflow mud slurry; and g. a fourth transport line interconnecting the second sump means to the second screen means.

2. The mud cleaning system of claim 1, including spray means for spraying water onto the sieve bend to aid in the separating process and increase recovery of barite particles.

* * * * *